(12) United States Patent
Minami et al.

(10) Patent No.: US 7,553,110 B2
(45) Date of Patent: Jun. 30, 2009

(54) CONVEYING EQUIPMENT AND INSPECTION DEVICE

(75) Inventors: Mitsuhiro Minami, Takatsuki (JP); Koji Tsutsumi, Suita (JP); Hiroki Makino, Kawanishi (JP); Norio Oita, Kobe (JP)

(73) Assignee: Daiichi Jitsugyo Viswill Co. Ltd., Osaka (JP)

( * ) Notice: Subject to any disclaimer, the term of this patent is extended or adjusted under 35 U.S.C. 154(b) by 932 days.

(21) Appl. No.: 10/505,784

(22) PCT Filed: Jan. 6, 2003

(86) PCT No.: PCT/JP03/00029

§ 371 (c)(1),
(2), (4) Date: Aug. 26, 2004

(87) PCT Pub. No.: WO03/072469

PCT Pub. Date: Sep. 4, 2003

(65) Prior Publication Data

US 2005/0236255 A1 Oct. 27, 2005

(30) Foreign Application Priority Data

Feb. 27, 2002 (JP) ............................. 2002-051165

(51) Int. Cl.
*B65G 53/40* (2006.01)

(52) U.S. Cl. ............................ 406/75; 406/31; 406/36; 406/88; 406/176; 209/906; 198/757; 198/758; 198/391

(58) Field of Classification Search ................... 406/75, 406/88, 31, 36, 87, 134, 176; 198/756, 757, 198/758, 391, 396; 209/147, 906

See application file for complete search history.

(56) References Cited

U.S. PATENT DOCUMENTS 3,650,369 A * 3/1972 Vergobbi ..................... 406/31

(Continued)

FOREIGN PATENT DOCUMENTS

EP 1138619 A1 10/2001

(Continued)

OTHER PUBLICATIONS

Microfilm of the specification and drawings annexed to the request of Japanese Utility Model Application No. 76288/1985 (Laid-open No. 191322/1986) Shinko Electric Co., Ltd.), Nov. 28, 1986.

(Continued)

*Primary Examiner*—Joe Dillon
(74) *Attorney, Agent, or Firm*—Birch, Stewart, Kolasch & Birch, LLP

(57) ABSTRACT

An appearance inspecting apparatus includes a parts feeder aligning rubber stoppers in tandem by torsionally vibrating a bowl having a spiral track formed therein, an air conveying portion conveying the rubber stoppers aligned in tandem by blowing compressed air thereto, first and second conveying tables conveying rubber stoppers by suction-holding a surface not to be inspected of the rubber stoppers, an inspecting portion inspecting a surface to be inspected of the rubber stoppers conveyed by the first and second conveying tables, and a selecting portion sorting out rubber stoppers that are determined to be defective, in accordance with the result of inspection by the inspecting portion. Objects to be inspected having a complicated shape are aligned preliminarily by using a vibration parts feeder, while highly accurate appearance inspection is conducted.

9 Claims, 15 Drawing Sheets

U.S. PATENT DOCUMENTS

| | | | | |
|---|---|---|---|---|
| 4,182,030 A * | 1/1980 | Mullins | .................. | 29/753 |
| 4,275,976 A * | 6/1981 | Sticht | .................. | 406/28 |
| 4,354,602 A * | 10/1982 | Miyoshi et al. | .................. | 209/545 |
| 4,440,286 A * | 4/1984 | Saxon | .................. | 198/380 |
| 4,619,360 A * | 10/1986 | Taniguchi et al. | .................. | 198/471.1 |
| 4,633,995 A * | 1/1987 | Hamada | .................. | 193/2 R |
| 4,757,382 A | 7/1988 | Kaziura et al. | | |
| 5,083,654 A | 1/1992 | Nakajima et al. | | |
| 6,024,210 A * | 2/2000 | Rosenstrom | .................. | 198/758 |
| 6,163,000 A * | 12/2000 | Huang | .................. | 209/574 |
| 6,450,320 B1 * | 9/2002 | Turek | .................. | 198/380 |
| 6,652,199 B2 * | 11/2003 | Miyazaki et al. | .................. | 406/181 |
| 6,666,626 B2 * | 12/2003 | McMahon et al. | .................. | 406/50 |
| 6,823,752 B2 * | 11/2004 | Kimura et al. | .................. | 73/865.8 |
| 6,968,936 B2 * | 11/2005 | Charpentier | .................. | 198/389 |

FOREIGN PATENT DOCUMENTS

| | | |
|---|---|---|
| JP | 59-217521 | 12/1984 |
| JP | 59-217521 A | 12/1984 |
| JP | 61-212374 A | 9/1986 |
| JP | 61-191322 | 11/1986 |
| JP | 62-77124 | 5/1987 |
| JP | 63-134415 | 6/1988 |
| JP | 63-134415 A | 6/1988 |
| JP | 01-313211 A | 12/1989 |
| JP | 5-278838 A | 10/1993 |
| JP | 9-86643 A | 3/1997 |
| JP | 9-226926 A | 9/1997 |
| JP | 11-208872 A | 8/1999 |
| JP | 2000-159334 A | 6/2000 |
| JP | 2000-266685 A | 9/2000 |

OTHER PUBLICATIONS

Microfilm of the specification and drawings annexed to the request of Japanese Utility Model Application No. 167408/1985 (Laid-open No. 77124/1987) (Shinko Electric Co., Ltd.), May 18, 1987.

Microfilm of the specification and drawings annexed to the request of Japanese Utility Model Application No. 118298/1988 (Laid-open No. 102749/1989) Fuji Electric Co., Ltd.) Jul. 11, 1989.

* cited by examiner

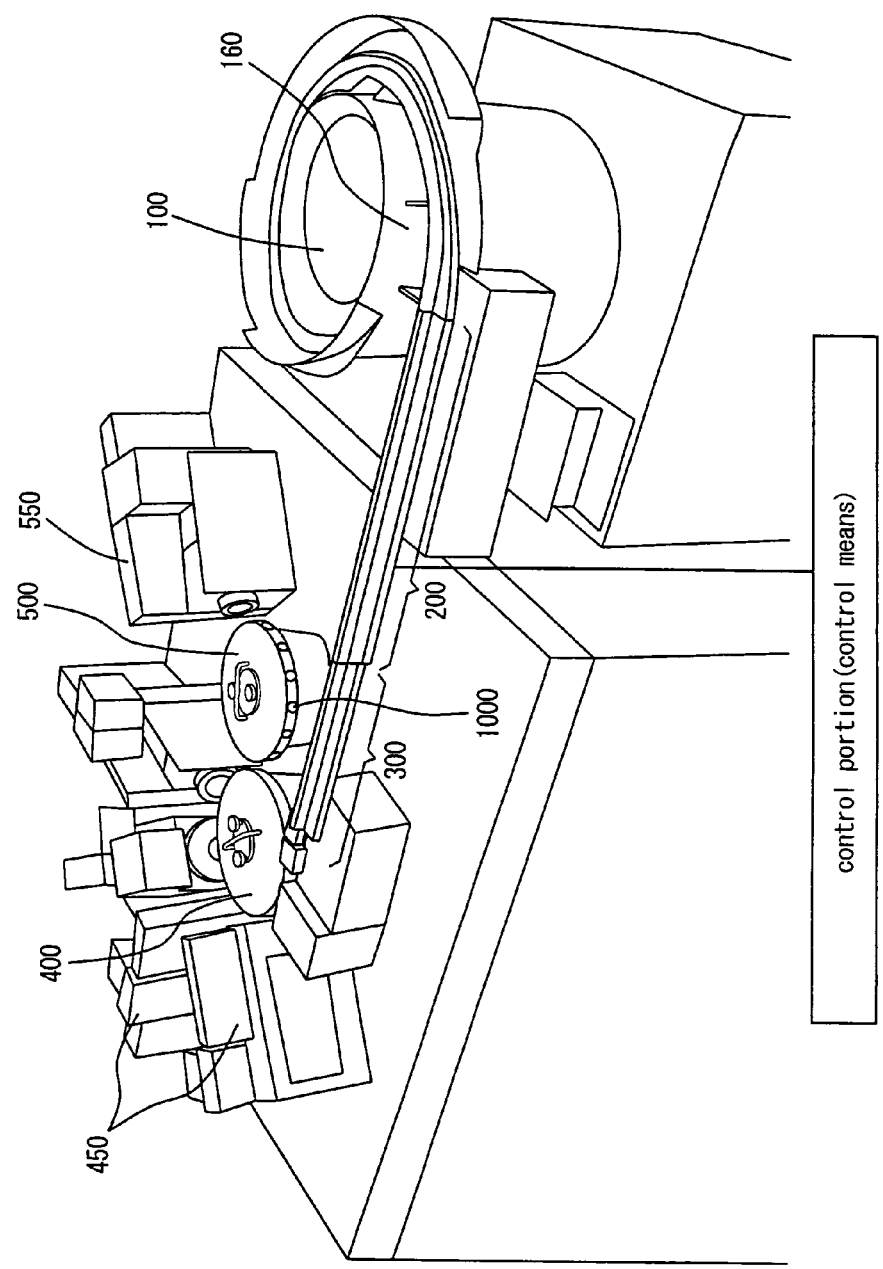

F I G. 1 0
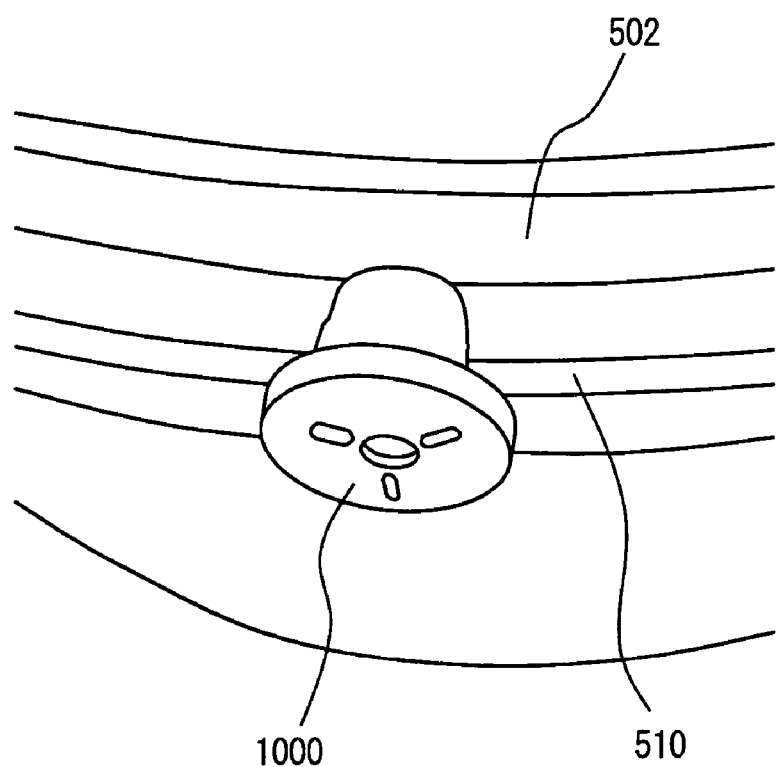

CONVEYING EQUIPMENT AND INSPECTION DEVICE

TECHNICAL FIELD

The present invention relates to an apparatus for inspecting an appearance of an object and an apparatus for conveying the object used with the appearance inspecting apparatus and, more specifically, to an inspecting apparatus for inspecting an appearance of an object such as a rubber stopper of an injection solution vial, caps, tablets and capsules having a not-entirely-uniform surface to be inspected, and to a conveying apparatus used for the inspecting apparatus.

BACKGROUND ART

A rubber stopper of an injection solution vial is put on an opening of the vial containing the injection solution, and peripheral portion of the stopper is fixed by a clamp. When the injection solution in the vial is to be introduced to a syringe, a syringe needle is put into the center of the rubber stopper.

In this manner, the rubber stopper for an injection vial comes to be in direct contact with the syringe needle. Therefore, it is necessary to inspect the appearance of the stopper before it is put on the vial. Japanese Patent Laying-Open No. 2000-266685 discloses an apparatus for inspecting appearance of such rubber stoppers. The inspecting apparatus disclosed in this laid-open application includes an aligning and supplying portion, a guide rail, a first conveying portion and a second conveying portion. The first conveying portion includes a first inspecting portion and a defect ejecting portion, and the second conveying portion includes a second inspecting portion and a defect ejecting portion. The aligning and supplying portion sets rubber stoppers to erect attitude, aligns the same in tandem in back-and-forth direction, and supplies the same to the first conveying portion. By way of example, a known parts feeder or the like may be used as the aligning and supplying portion. The guide rail guides the rubber stoppers supplied from the aligning and supplying portion and supplies the rubber stoppers to the first conveying portion while regulating their positions in the left-and-right direction. A known belt conveyer or the like may be used as the first conveying portion. The first conveying portion conveys forward the rubber stoppers in the erect attitude at a constant speed, while supporting from below the rubber stoppers at prescribed positions in the left-and-right direction, so that the stoppers are positioned at a prescribed interval in the back-and-forth direction. The second conveying portion conveys forward the rubber stoppers in the erect attitude at a constant speed, while supporting from above the rubber stoppers at prescribed positions in the left-and-right direction, so that the stoppers are positioned at a prescribed interval in the back-and-forth direction.

In the inspecting apparatus, when the rubber stoppers are vibrated at the aligning and supplying portion employing the known vibratory parts feeder or the like, the rubber stoppers are aligned in tandem in erect attitude. The stoppers in this state are guided by the guide rail, and at a first inspecting portion of the first conveying portion, appearance is inspected.

In the inspecting apparatus disclosed in the laid-open application described above, however, vibration of the parts feeder at the aligning and supplying portion is transmitted to the inspecting portion. Therefore, a CCD (Charge Coupled Device) camera at the inspecting portion vibrates, and clear imaging of the rubber stoppers becomes impossible. This makes accurate inspection difficult.

The present invention was made to solve the above-described problem, and its object is to provide an inspecting apparatus enabling accurate inspection, of which inspection area is free of any influence of vibration even when objects have complicated shapes and are preliminarily aligned by using a vibratory parts feeder, as well as to provide a conveying apparatus used for the inspecting apparatus.

DISCLOSURE OF THE INVENTION

In order to attain the above described object, the first present invention provides a conveying apparatus including: aligning means for aligning in tandem objects to be conveyed, by applying vibration to the objects; and conveying means connected to the aligning means for conveying the objects by blowing compressed air to the objects aligned in tandem.

According to the first invention, by the aligning means, the objects to be conveyed such as rubber stoppers having a complicated shape are aligned in tandem. At this time, the rubber stoppers placed on a spiral track move on the track and are aligned in tandem, while the rubber stoppers themselves rotate, because of torsional vibration. Thereafter, the aligned rubber stoppers are conveyed not by vibration but by the force generated by jet compressed air. Thus, the conveying means is free of any vibration, and therefore, it becomes possible to mount an inspection camera or the like on the conveying means and to inspect without any vibration. As a result, even when the objects are aligned preliminarily by using aligning means such as a vibratory parts feeder, the inspection area is free of any influence thereof, and thus, a conveying apparatus enabling accurate inspection can be provided.

The conveying apparatus in accordance with the second invention further includes, in addition to the structure of the first invention, feeding means connected to the aligning means and the conveying means, for feeding the objects to be conveyed to the conveying means, by applying vibration to the objects that are aligned in tandem, in a traveling direction of the objects to be conveyed.

According to the second invention, as the feeding means for generating vibration in the traveling direction of the objects to be conveyed is provided, vibration of the aligning means is less likely to propagate to the conveying means.

The conveying apparatus in accordance with the third invention further includes, in addition to the structure of the second invention, retaining means connected to the feeding means and the conveying means, for retaining a predetermined number of objects to be conveyed, and control means for controlling the feeding means such that vibration of the feeding means is activated and stopped based on the number of objects retained by the retaining means.

According to the third invention, when the predetermined number of rubber stoppers are retained by the retaining means, vibration of the feeding means is stopped, so as to stop transfer of the object from the feeding means to the conveying means. Thus, only a prescribed number of rubber stoppers are supplied to the conveying means that blows compressed air to the rubber stoppers. As a result, such a situation that the conveying means is forced to convey rubber stoppers exceeding the prescribed number at one time does not occur, and therefore, failure in conveying the objects can be prevented.

In the conveying apparatus in accordance with the fourth invention, in addition to the structure of any of the first to third inventions, the aligning means includes means for aligning the objects to be conveyed in tandem in a predetermined orientation, by torsionally vibrating a bowl having a spiral track formed therein and blowing compressed air to the objects to be conveyed placed on the track.

According to the fourth invention, as the aligning means is provided, the rubber stoppers that are placed on the spiral track move over the track and are aligned in tandem in a predetermined orientation, while the rubber stoppers themselves are rotated by the torsional vibration and the compressed air blown thereto. Accordingly, the aligning means can surely set the rubber stoppers to the predetermined orientation.

The inspecting apparatus in accordance with the fifth invention includes: aligning means for aligning the objects to be inspected in tandem by applying vibration to the objects; conveying means connected to the aligning means for conveying the objects to be inspected by blowing compressed air to the objects aligned in tandem; inspecting and conveying means connected to the conveying means for attracting by suction a surface that is not to be inspected of the objects to be inspected and for conveying; and inspecting means for inspecting a surface to be inspected of the objects conveyed by the inspecting and conveying means.

According to the fifth invention, by the aligning means, the objects to be inspected having a complex shape such as rubber stoppers are aligned in tandem. At this time, the rubber stoppers that are placed on the spiral track, for example, move over the track and are aligned in tandem, while the rubber stoppers themselves are rotated by torsional vibration. Then, the aligned rubber stoppers are conveyed by the force generated by the jet compressed air, not by vibration. The inspecting and conveying means suction-holds a surface not to be inspected of the object by air suction, and in this state, the objects are inspected by the inspecting means. Acceptable rubber stoppers are separated from defective ones, based on the result of inspection. Therefore, there is no vibration in the conveying means and the inspecting and conveying means, so that it is possible to inspect without any influence of vibration, by arranging the inspecting means in the inspecting and conveying means. As a result, even when objects are aligned preliminarily by using the aligning means such as a vibratory parts feeder, the inspecting area is free of any influence thereof, and thus, an inspecting apparatus capable of accurate inspection can be provided.

In the inspecting apparatus in accordance with the sixth invention, in addition to the structure of the fifth invention, the inspecting and conveying means includes at least two projections provided to abut a side surface, in the traveling direction, of a column of the object to be inspected, and means for conveying by suction-holding the surface not-to-be-inspected of the object positioned by the projections.

According to the sixth invention, the object to be inspected has a columnar bottom portion, and the bottom surface of the column is the surface that is not to be inspected. The projections abut at least two portions of the side surface of the column, and can easily position the object to be inspected. Particularly, when the object is conveyed by compressed air, it is difficult to position the object by utilizing a recessed portion fitting the shape of the entire circumference of the bottom surface of the column. Even in that case, the object to be inspected can easily be positioned.

The inspecting apparatus in accordance with the seventh invention includes, in addition to the structure of the fifth invention, feeding means connected to the aligning means and the conveying means for feeding the object to be conveyed to the conveying means, by applying vibration to the objects to be inspected that are aligned in tandem, in a traveling direction of the objects to be conveyed.

According to the seventh invention, as the feeding means is provided that vibrates in the traveling direction of the objects to be inspected, vibration of the aligning means is less likely to propagate to the conveying means.

The inspecting apparatus in accordance with the eighth invention includes, in addition to the structure of the seventh invention, retaining means connected to the feeding means and the conveying means for retaining a predetermined number of objects to be inspected, and control means for controlling the feeding means such that vibration of the feeding means is activated and stopped based on the number of objects to be inspected retained by the retaining means.

According to the eighth invention, when a predetermined number of rubber stoppers are retained by the retaining means, vibration of the feeding means is stopped, so that transfer from the feeding means to the conveying means is stopped. Accordingly, it follows that only a prescribed number of rubber stoppers are supplied to the conveying means that blows compressed air to the rubber stoppers. As a result, such a situation that the conveying means is forced to convey rubber stoppers exceeding the prescribed number at one time does not occur, and therefore, failure in conveying the objects can be prevented.

In the inspecting apparatus in accordance with the ninth invention, in addition to the structure of any of the fifth to eighth inventions, the aligning means includes means for aligning the objects to be inspected in tandem in a predetermined orientation, by torsionally vibrating a bowl having a spiral track formed therein and by blowing compressed air to the objects to be conveyed on the track.

According to the ninth invention, as the aligning means is provided, the rubber stoppers that are placed on the spiral track move over the track and are aligned in tandem in a predetermined orientation, while the rubber stoppers themselves are rotated by the torsional vibration and the compressed air blown thereto. Accordingly, the aligning means can surely set the rubber stoppers to the predetermined orientation.

BRIEF DESCRIPTION OF THE DRAWINGS

FIG. 1 is a perspective overall view of the appearance inspecting apparatus in accordance with an embodiment of the present invention.

FIG. 10 is a perspective view (part 1) of a second conveying table of the appearance inspecting apparatus in accordance with the embodiment of the present invention.

BEST MODES FOR CARRYING OUT THE INVENTION

Figure 2:
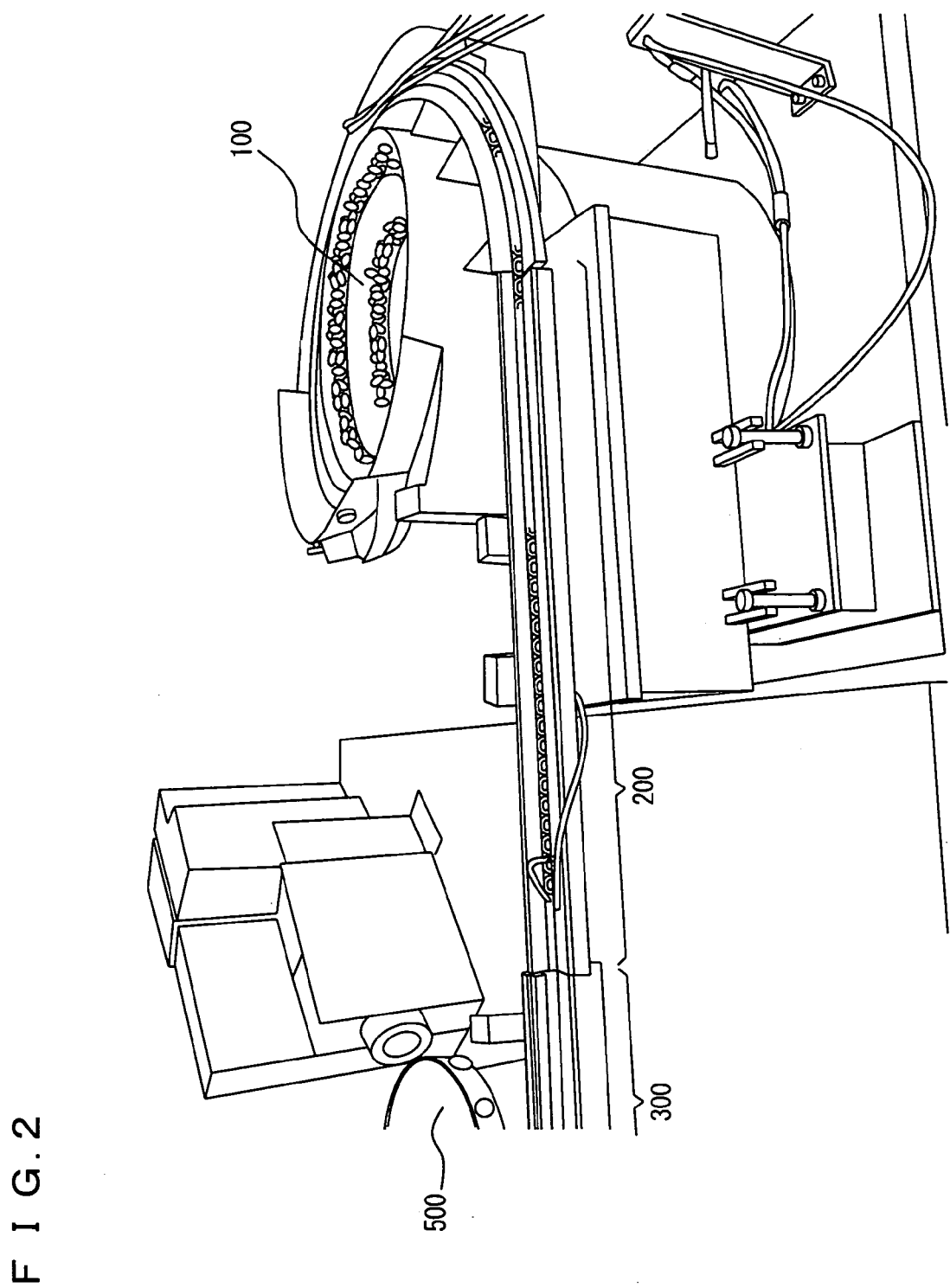
FIG. 2 is a perspective view (part 1) of the appearance inspecting apparatus in accordance with the embodiment of the present invention.

One embodiment of the present invention will be described in the following with reference to the figures. In the following description, same parts are denoted by same reference characters. Names and functions of these parts are also the same. Therefore, detailed description thereof will not be repeated.

FIG. 1 is a perspective overall view of the appearance inspecting apparatus in accordance with the present embodiment. As shown in FIG. 1, the appearance inspecting apparatus includes a parts feeder 100 for aligning rubber stoppers 1000 as the objects to be inspected, a linear feeder 200 for conveying rubber stoppers 1000 over linear feeder 200 by applying vibration, in linear direction, to the aligned rubber stoppers 1000, an air conveying portion 300 connected to linear feeder 200 for conveying rubber stoppers 1000 to a first conveying table 400 by blowing compressed air to rubber stoppers 1000 that have been conveyed by linear feeder 200, the first conveying table 400 holding the bottom surfaces of rubber stoppers 1000 that have been conveyed by the air conveying portion 300, for conveying the rubber stoppers to a first inspecting portion 450 that inspects upper surface side of rubber stoppers 1000, and a second conveying table 500, to which rubber stoppers 1000 conveyed by the first conveying table 400 are transferred, holding the upper surfaces of rubber stoppers 1000 and conveying the rubber stoppers to a second inspecting portion 550 that inspects bottom surface side of rubber stoppers 1000.

Parts-feeder 100 is vibrated in a prescribed direction, as will be described later, and by the thus applied vibration, rubber stoppers 1000 move along a spiral track. During the movement, rubber stoppers 1000 are rotated by the vibration in the prescribed direction, and guided by an orientation regulator guide provided in a bowl, so that the orientation of rubber stoppers 1000 is determined.

Linear feeder vibrates in lateral direction. By the vibration, linear feeder 200 conveys rubber stoppers 1000 that have been received from parts feeder 100 to air conveying portion 300. At this time, if the number of rubber stoppers 1000 to be conveyed to air conveying portion 300 is too large, rubber stoppers 1000 exceeding a predetermined number cannot be conveyed even by the blowing of the compressed air in air conveying portion 300. Therefore, when a prescribed number of rubber stoppers 1000 are retained in a retaining portion of linear feeder 200, linear feeder 200 stops its vibration, so as to stop transfer of rubber stoppers 1000 to air conveying portion 300.

In air conveying portion 300, compressed air is constantly blown out in the traveling direction of rubber stoppers 1000 along a guide. By the force of the compressed air, rubber stoppers are conveyed to the first conveying table 400. The first and second conveying tables are round tables that hold rubber stoppers 1000 one by one by air-suction, and rotate in a predetermined direction to convey the rubber stoppers 1000.

FIG. 2 shows parts feeder 100 and linear feeder 200. As shown in FIG. 2, linear feeder 200 has a function of passing rubber stoppers 1000 conveyed from parts feeder 100 to air conveying portion 300.

Figure 3:
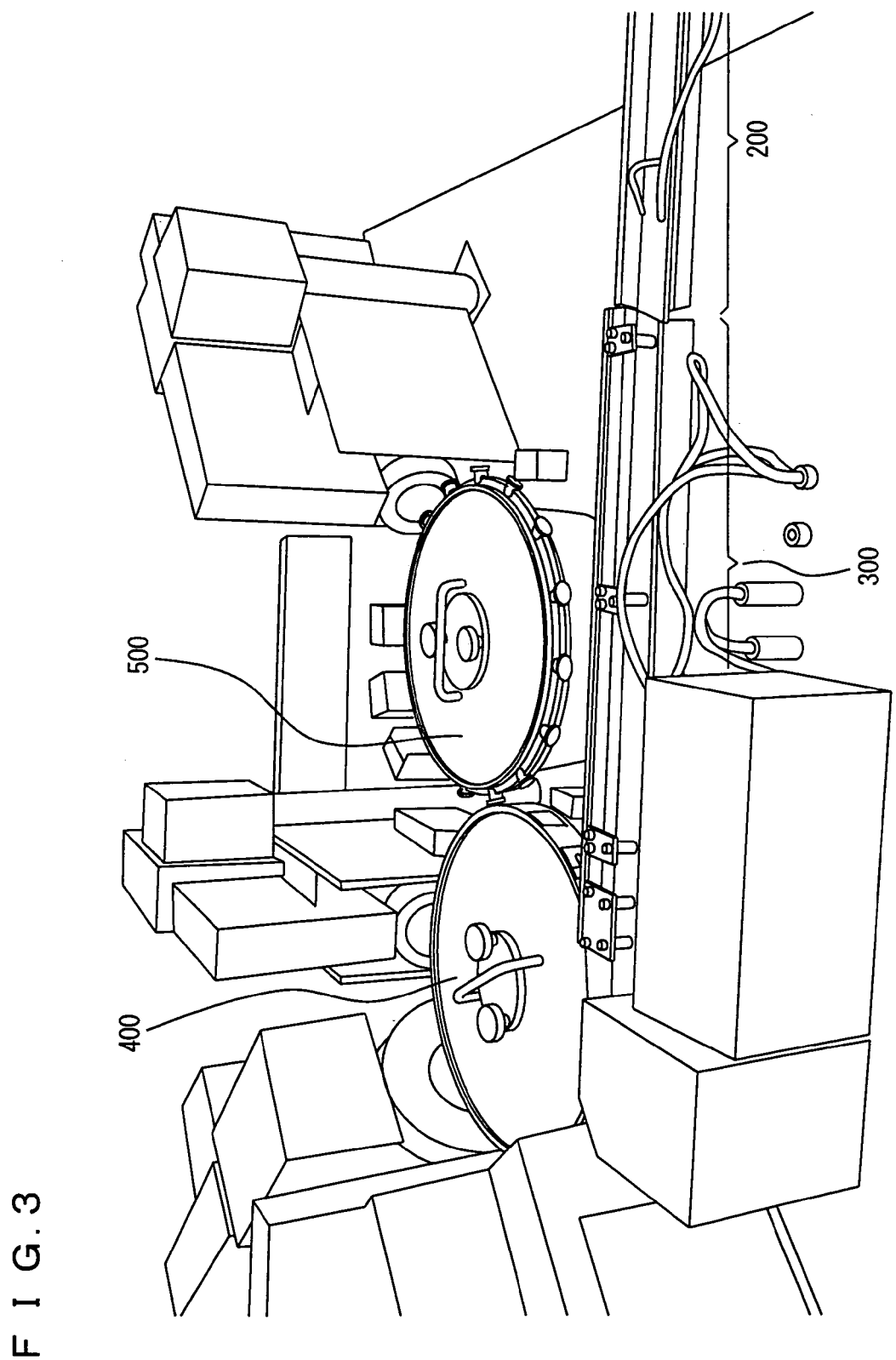
FIG. 3 is a perspective view (part 2) of the appearance inspecting apparatus in accordance with the embodiment of the present invention.

FIG. 3 shows air conveying portion 300 and first and second conveying tables 400 and 500. Rubber stoppers 1000 that have been conveyed by air conveying portion 300 are held at positions of suction openings for air-suction provided at prescribed intervals on a cylindrical end surface, and conveyed by the first and second conveying tables 400 and 500. The first and second conveying tables 400 and 500 rotate in synchronization with each other at a prescribed speed of rotation. During the rotation, images of illuminated rubber stoppers 1000 are picked-up by first and second inspection cameras, and the appearance is inspected by an image processing apparatus. Here, any damage, dust or the like on the surface of rubber stoppers 1000 is detected.

Figure 4:
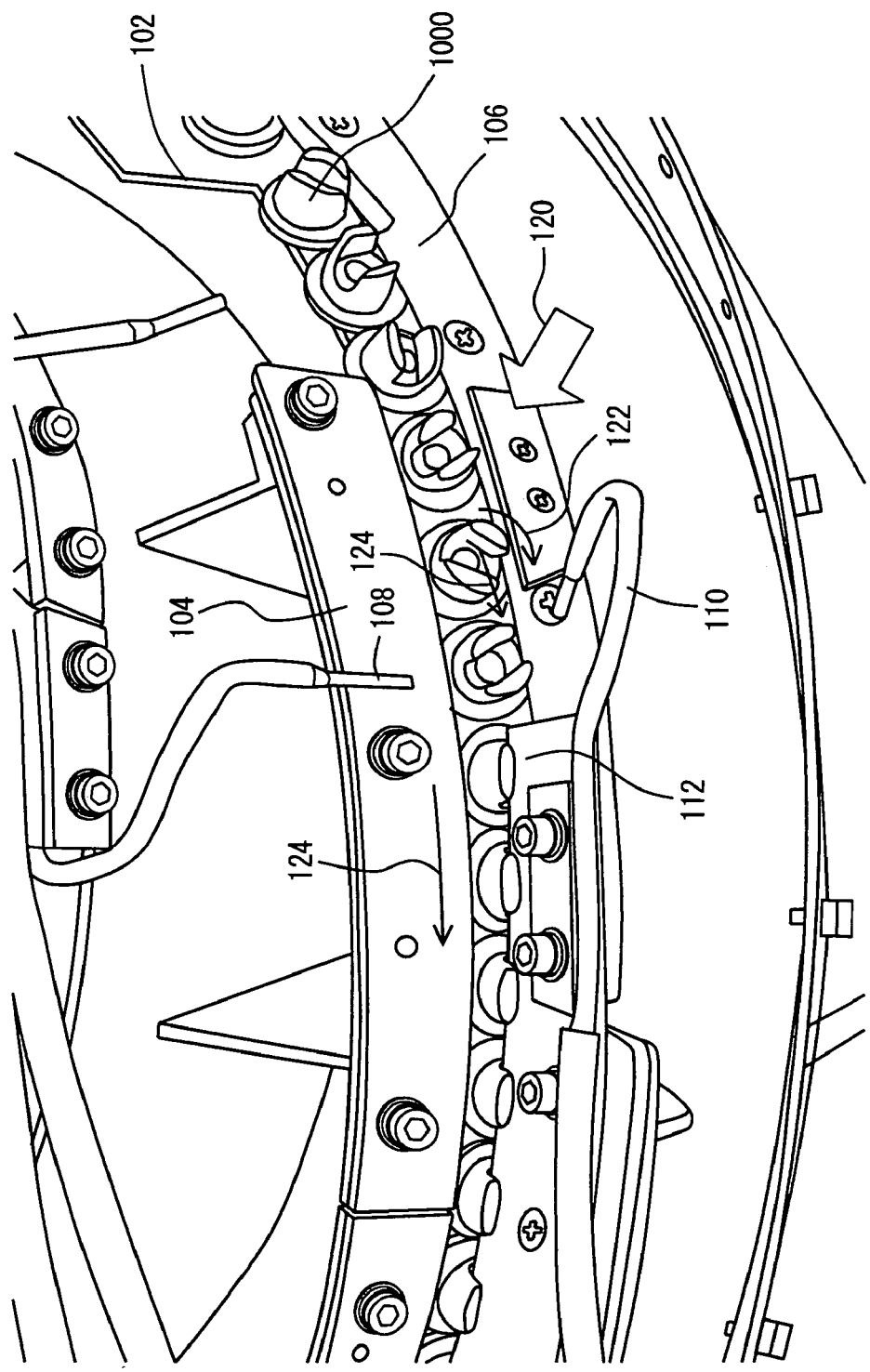
FIG. 4 is a perspective view of a parts feeder of the appearance inspecting apparatus in accordance with the embodiment of the present invention.

FIG. 4 is an enlarged view of parts feeder 100. As shown in FIG. 4, parts feeder 100 is torsionally vibrated in the direction of the arrow 120. Therefore, on rubber stoppers 1000, the force in the traveling direction represented by the arrow 124 and the force in the direction of rotation represented by the arrow 122 are exerted. By these two forces, rubber stoppers 1000 are conveyed in the direction of the arrow 124 while rotating, along a guide 106. At this time, rubber stoppers 1000 having upper and bottom surfaces positioned upside-down fall through a cutout 102 to bowl 160. In addition to guide 106, a guide 104 is provided at an upper portion opposing to guide 106, corresponding to the shape of rubber stoppers 1000.

At a position facing an upper gap of rubber stoppers 1000, an orientation regulator guide 112 is provided. By orientation regulator guide 112 and by the function of rotation of rubber stoppers 1000, orientation of rubber stoppers 1000 is set in a prescribed direction, as rubber stoppers are conveyed in the direction of the arrow 124 while rotating, abut orientation regulator guide 112 while continuously rotating, and are guided as they rotate, by orientation regulator guide 112. In order to promote rotation of rubber stopper 1000 at the position where orientation regulator guide is provided, compressed air is blown out from air ducts 108 and 110. The emitted compressed air is directed to an upper portion of rubber stopper 1000, facilitating rotation of rubber stopper 1000.

Figure 5:
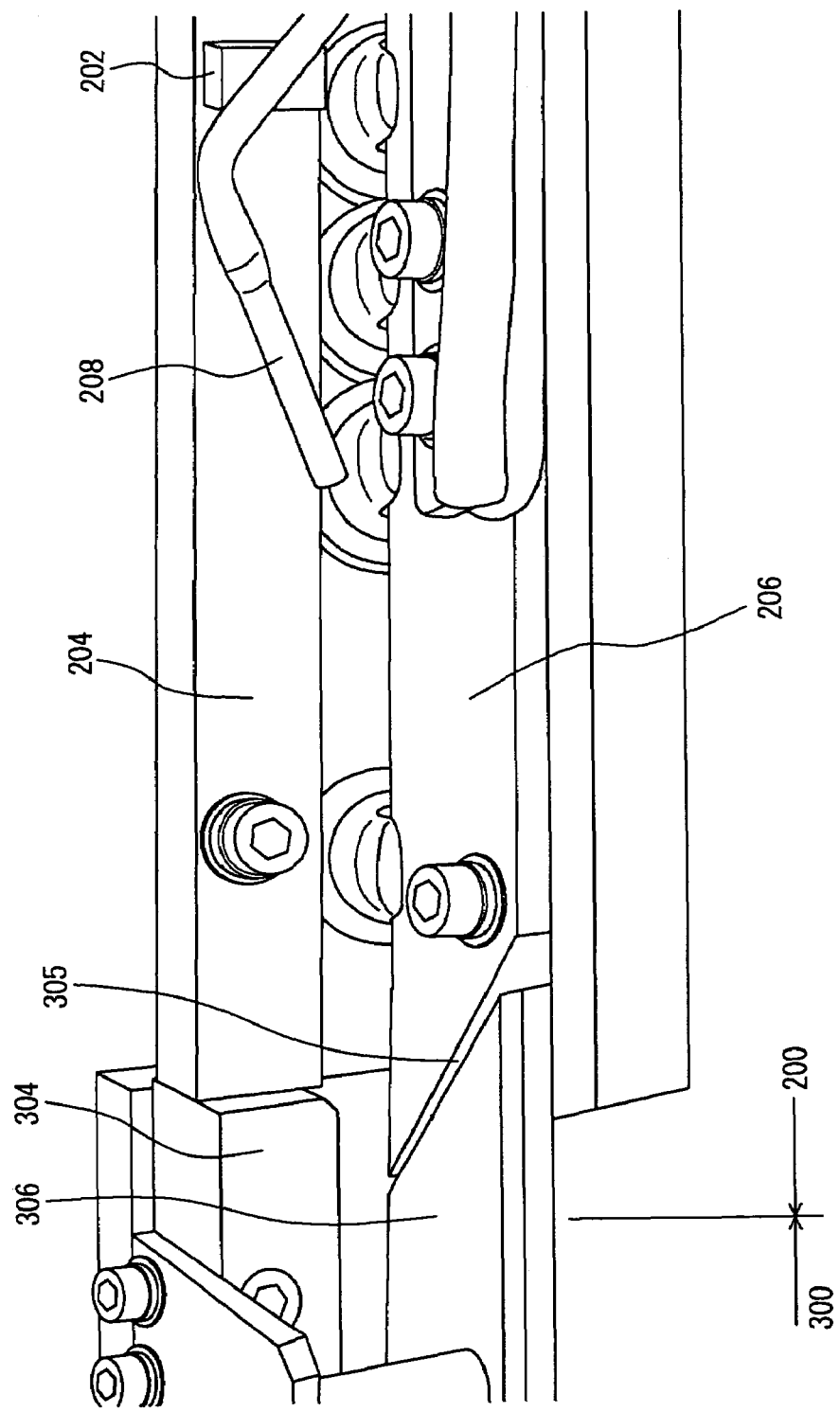
FIG. 5 is a perspective view of a linear feeder of the appearance inspecting apparatus in accordance with the embodiment of the present invention.

FIG. 5 shows a junction portion between linear feeder 200 and air conveying portion 300. Linear feeder 200 has conveying guides 204 and 206 provided therein, and conveys rubber stoppers 1000 by vibration in the traveling direction. Further, a sensor 202 is provided at a retaining portion, for detecting that a predetermined number of rubber stoppers 1000 (for example, three) are accumulated. When the third rubber stopper 1000 is detected by sensor 202, vibration of linear feeder 200 is stopped, and transfer of rubber stoppers 1000 from linear feeder 200 to air conveying portion 300 is stopped.

As shown in FIG. 5, conveying guides 204 and 206 are provided at positions opposing to guides 304 and 306 of air conveying portion 300 with a small space 305 therebetween. This small space 305 prevents propagation of the vibration of parts feeder in the prescribed direction as well as the vibration of linear feeder 200 in the traveling direction of rubber stoppers 1000 to air conveying portion 300.

This portion will be described in detail. The space 305 between conveying guide 206 and guide 306 is set to be wider to this side of the sheet and narrower in the depth direction of the sheet. The space 305 is at least the amplitude of vibration in the traveling direction of rubber stoppers 1000 of linear feeder 200 plus a margin α. Further, as shown in FIG. 5, the space 305 is set not orthogonal to but diagonal to the traveling direction of rubber stoppers 1000. This prevents any rubber stopper 1000 from being caught when it is transferred from linear feeder 200 to air conveying portion 300, and prevents propagation of vibration of linear feeder 200 in the traveling direction of rubber stoppers 1000 to air conveying portion 300.

Further, air duct 208 is provided closer to liner feeder 200 than the space 305 such that the compressed air blown out from air duct 208 forms an air flow along conveying guides 204 and 206. By such an arrangement, rubber stoppers 1000 can be conveyed with a small amount of air.

Figure 6:
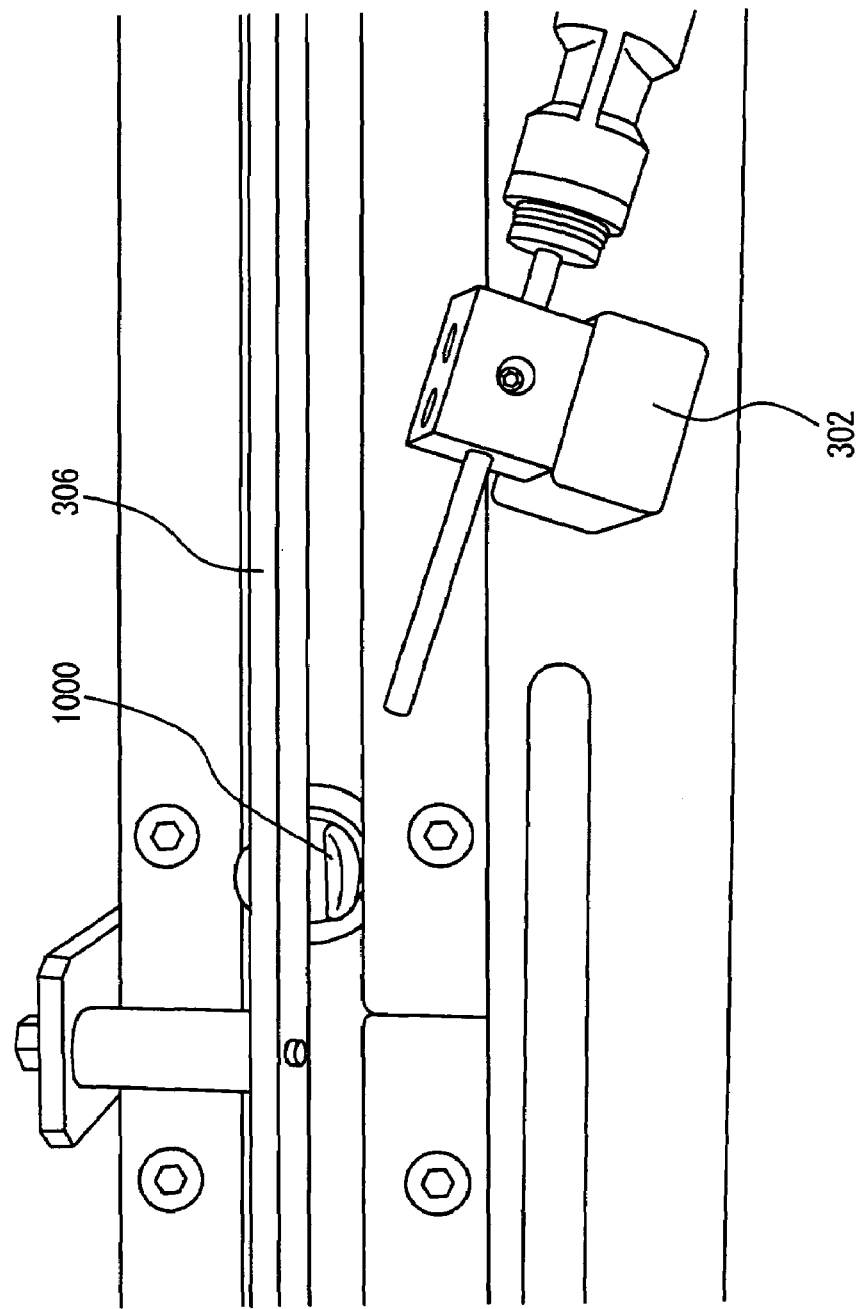
FIG. 6 is a perspective view of an air conveying portion of the appearance inspecting apparatus in accordance with the embodiment of the present invention.

FIG. 6 shows details of air conveying portion 300. As shown in FIG. 6, in air conveying portion 300, rubber stopper 1000 is conveyed toward the first conveying table 400 by the compressed air blown out from air nozzle 302, with an upper gap sliding along guide 306. It is noted that the compressed air is constantly blown out from the air duct.

Figure 7:
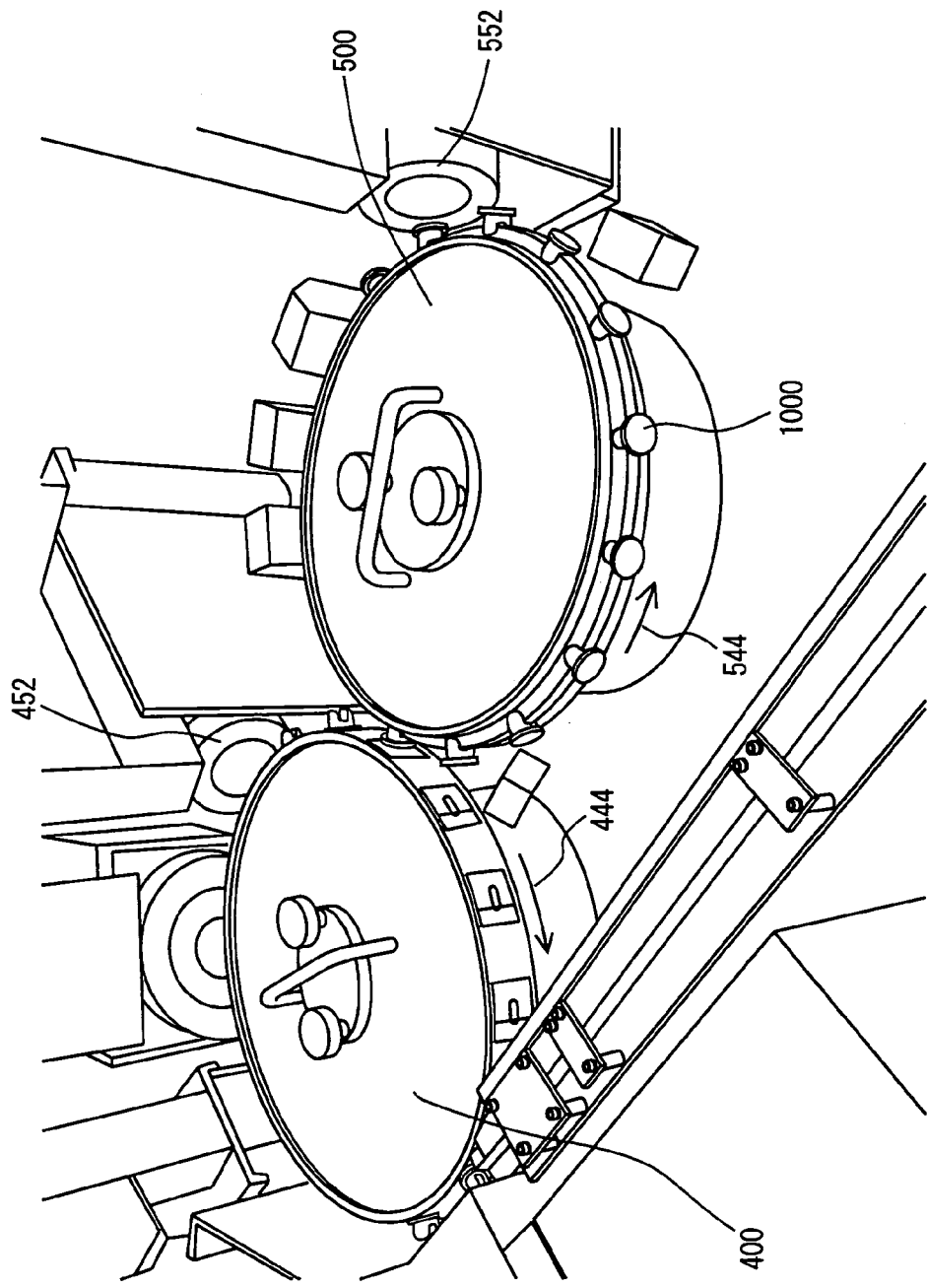
FIG. 7 is a perspective view of an inspecting portion of the appearance inspecting apparatus in accordance with the embodiment of the present invention.

FIG. 7 shows details of the inspecting portion of the appearance inspecting apparatus in accordance with the present embodiment. As shown in FIG. 7, first and second conveying tables 400 and 500 are provided at the inspecting portion. The first conveying table 400 rotates in the direction of the arrow 444, while the second conveying table 500 rotates in the direction of the arrow 544.

Rubber stoppers 1000 conveyed by air conveying portion 300 are passed to the first conveying table 400, and held by air-suction and conveyed by the first conveying table 400 that rotates in the direction of the arrow 444. The first and second conveying tables 400 and 500 are placed spaced by a prescribed distance (height of rubber stopper 1000–depth of upper gap+margin) at a position where circumferences oppose to each other. At this position, rubber stopper 1000 is passed from the first conveying table 400 to the second conveying table 500. The rubber stopper 1000 that has been passed to the second conveying table 500 is held by air-suction and conveyed, by the second conveying table 500 rotating in the direction of the arrow 544.

While rubber stoppers 1000 are conveyed by rotation of the first and second conveying tables 400 and 500, images of the rubber stoppers are picked-up, for example, by first and second inspection cameras 452 and 552, for inspecting appearance of the rubber stoppers.

Figure 8:
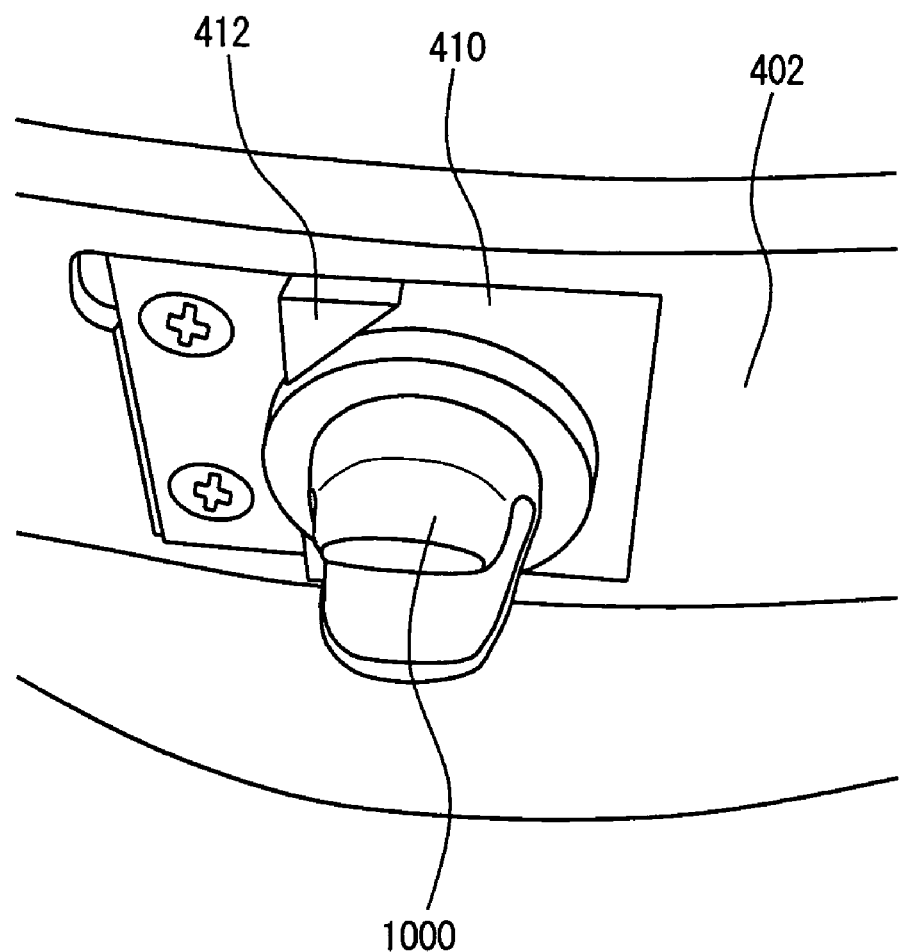
FIG. 8 is a perspective view (part 1) of a first conveying table of the appearance inspecting apparatus in accordance with the embodiment of the present invention.

Referring to FIG. 8, the first conveying table 400 will be described. FIG. 8 shows an end surface along the circumferential direction of the first conveying table 400. As shown in FIG. 8, rubber stopper 1000 is conveyed with its bottom portion held by air-suction. On a first end surface 402 of a rotation table of the first conveying table 400, positioning bases 410 are formed at a predetermined interval, along the circumferential direction. The positioning base 410 is designed to be easily detachable. Therefore, when the shape of rubber stoppers 1000 is to be changed, the positioning base can easily be changed to different base 410 that corresponds to the changed shape of the rubber stoppers.

Positioning base 410 has triangular positioning members 412 arranged in symmetry at upper and lower portions. Positioning members 412 are not in contact with the circumference of the bottom surface of rubber stopper 1000, but rather, each of the positioning members 412 provided in symmetry at upper and lower portions is in point contact, for positioning. This means that the contact area is small, and that positioning is easy. Though positioning member 412 having a triangular shape has been described as an example, it may have any other polygonal shape such as a rectangular shape, or it may have a columnar shape. As the positioning member 412 rotates together with the rotation of the first conveying table 400, columnar projection without any angle is preferred in view of safety and is inexpensive, as compared with an angular one such as a triangular projection.

Figure 9:
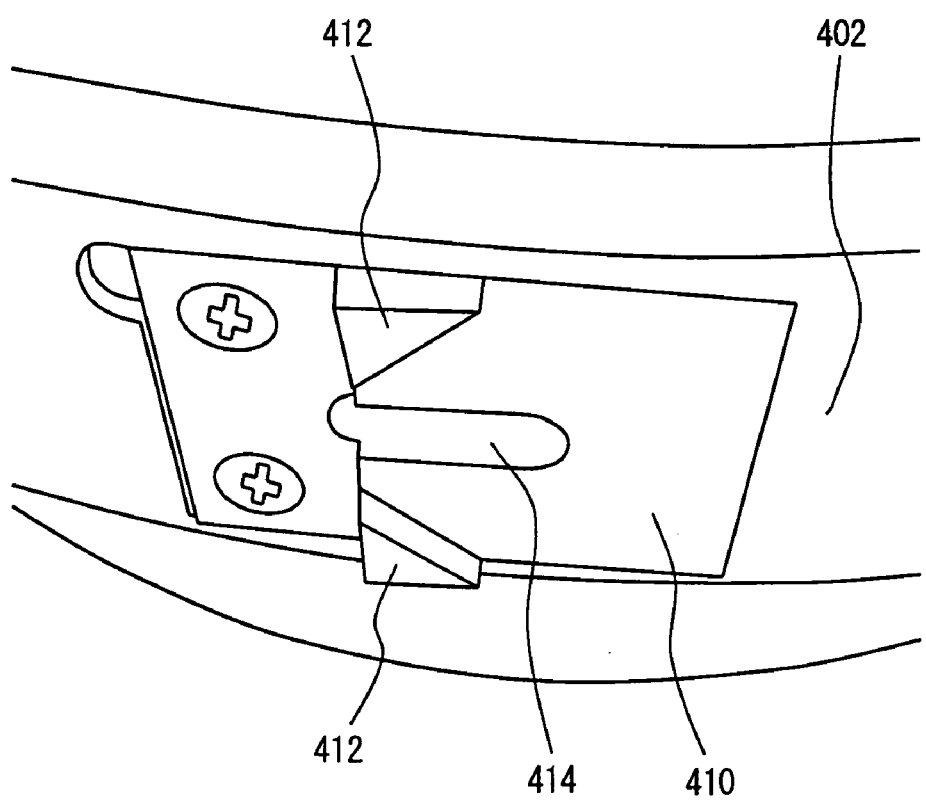
FIG. 9 is a perspective view (part 2) of the first conveying table of the appearance inspecting apparatus in accordance with the embodiment of the present invention.

Referring to FIG. 9, positioning base 410 has a suction opening 414 for air suction. Rubber stopper 1000 has its bottom surface held by the force of air sucked through suction opening 414, and is conveyed by the first conveying table 400 to the first inspecting portion 450.

Referring to FIG. 10, the second conveying table 500 will be described. FIG. 10 shows an end surface along the circumferential direction of the second conveying table 500. As shown in FIG. 10, rubber stopper 1000 is conveyed with its upper portion held by air suction. On a second end surface 502 of a rotating table of the second conveying table 500, a guide portion 510 guiding the upper gap of rubber stopper 1000 is provided.

Figure 11:
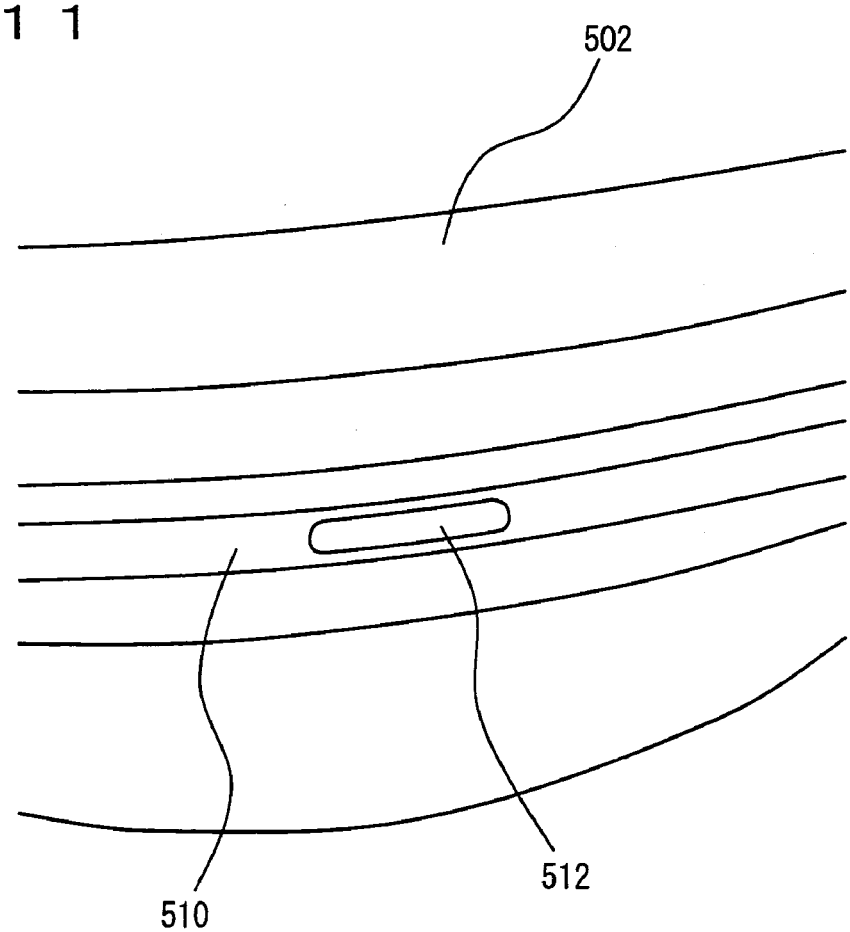
FIG. 11 is a perspective view (part 2) of the second conveying table of the appearance inspecting apparatus in accordance with the embodiment of the present invention.

Referring to FIG. 11, guide portion 510 has a suction opening 512 for air suction. Rubber stopper 1000 is held by the force of air sucked through suction opening 512, and is conveyed by the second conveying table 500 to the second inspecting portion 550.

Figure 12:
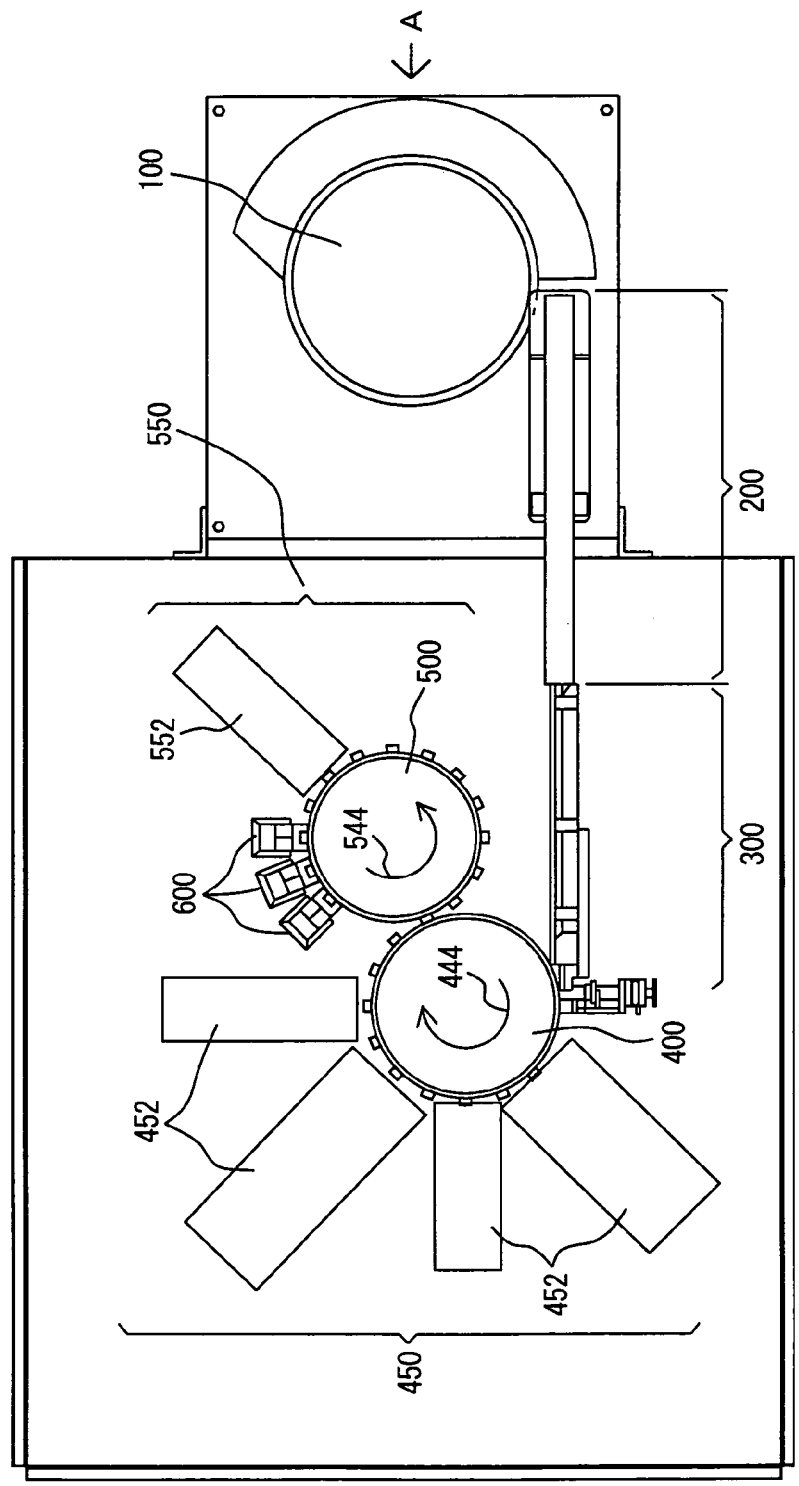
FIG. 12 is a plan view of the appearance inspecting apparatus in accordance with the embodiment of the present invention.

FIG. 12 is a plan view of the appearance inspecting apparatus in accordance with the present embodiment. As show in FIG. 12, the appearance inspecting apparatus includes, as described with reference to the perspective view, parts feeder 100, linear feeder 200, air conveying portion 300, first conveying table 400, second conveying table 500, and selecting portion 600.

Figure 13:
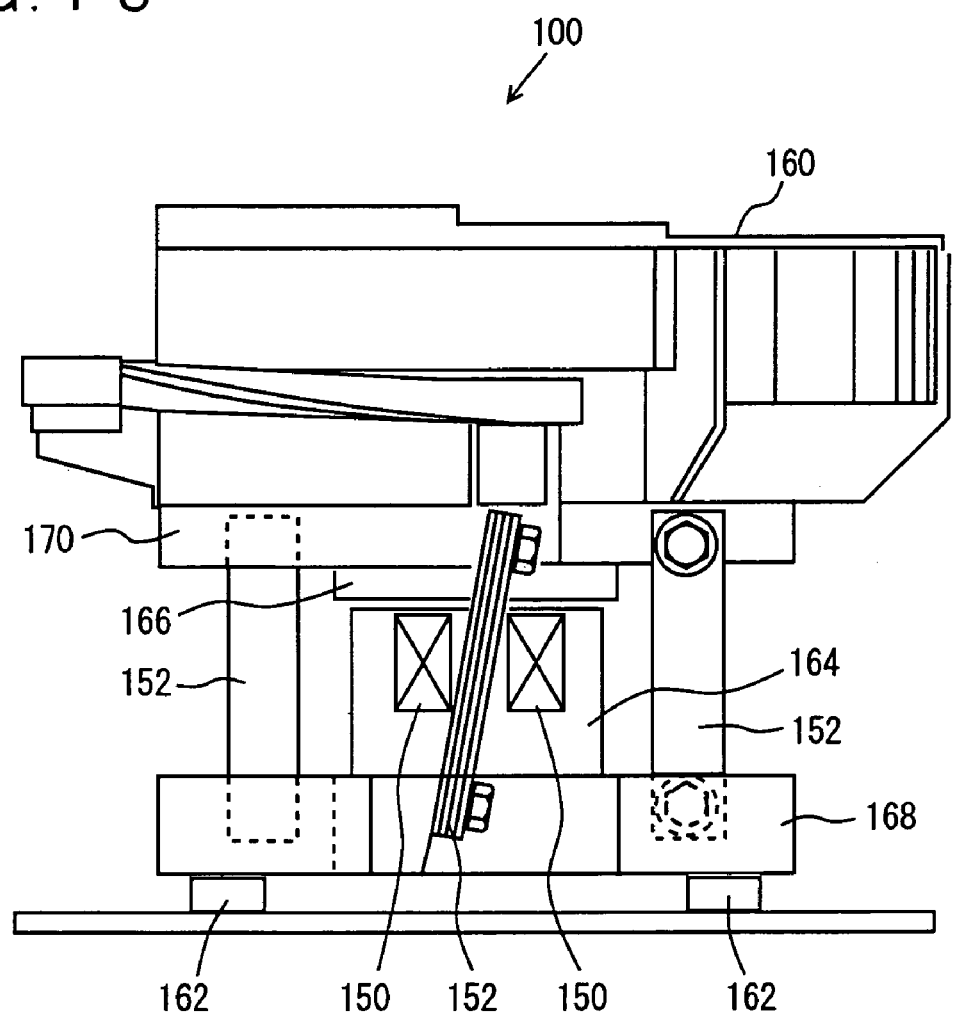
FIG. 13 is a side view of a vibratory parts feeder of the appearance inspecting apparatus in accordance with the embodiment of the present invention.

Referring to FIG. 13, parts feeder 100 of the appearance inspecting apparatus in accordance with the present embodiment will be described. This figure is viewed from the direction of the arrow A in FIG. 12. As shown in FIG. 13, parts feeder 100 has a bowl 160 coupled to a base block 168 below by means of inclined leaf springs 152 arranged at equal angles. On a bottom surface of bowl 160, a leaf spring mounting block 170 is fixed, and a movable core 166 formed of a magnetic material is fixed at the bottom of the mounting block and opposed to an electromagnet 164 fixed on base block 168 and having an electromagnetic coil 150 wound therearound, with a predetermined space there between. Parts feeder 100 as a whole is supported on a floor by an anti-vibration rubber 162.

Figure 14:
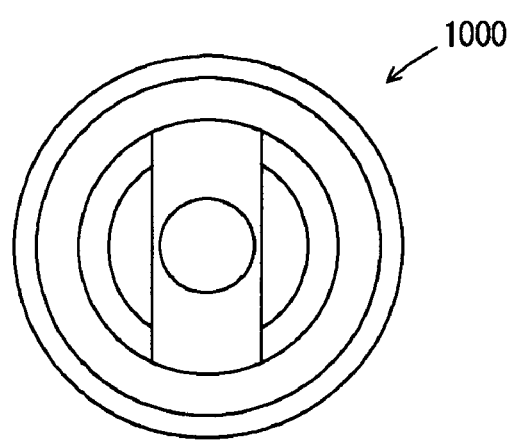
FIG. 14 is a top view of a rubber stopper to be inspected by the appearance inspecting apparatus in accordance with the embodiment of the present invention.
Figure 15:
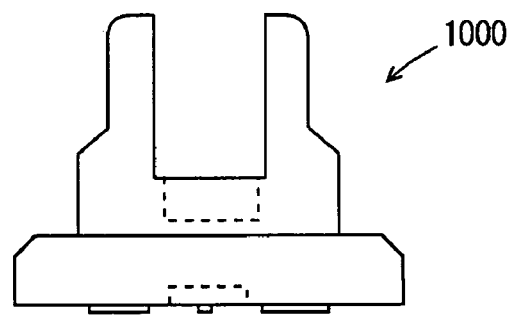
FIG. 15 is a side view of the rubber stopper to be inspected by the appearance inspecting apparatus in accordance with the embodiment of the present invention.
Figure 16:
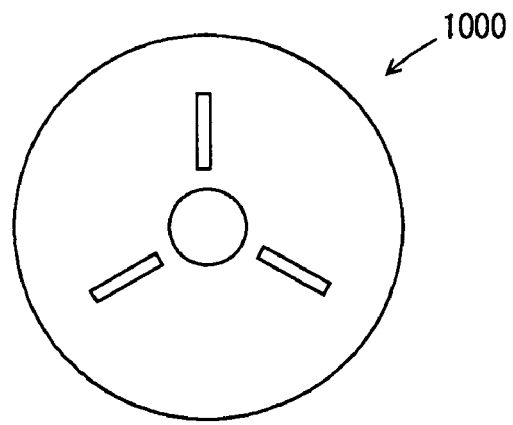
FIG. 16 is a bottom view of the rubber stopper to be inspected by the appearance inspecting apparatus in accordance with the embodiment of the present invention.

Referring to FIGS. 14 to 16, rubber stopper 1000 to be inspected by the appearance inspecting apparatus in accordance with the present embodiment will be described. FIG. 14 is a top view, FIG. 15 is a side view and FIG. 16 is a bottom view. As shown in FIGS. 14 to 16, rubber stopper 1000 has its upper portion partially cut out to form an upper gap, and has an almost flat bottom surface. The above-described plurality of guides are formed opposed to the upper gap, and rubber stopper 1000 is conveyed with the upper gap sliding along the guides. In the present embodiment, rubber stopper 1000 has its upper surface side inspected by the first inspecting portion 450 and its bottom surface side inspected by the second inspecting portion 550 while being conveyed by the first and second conveying tables 400 and 500, so that the appearance of the entire surface of rubber stopper 1000 can be inspected.

Figure 17:
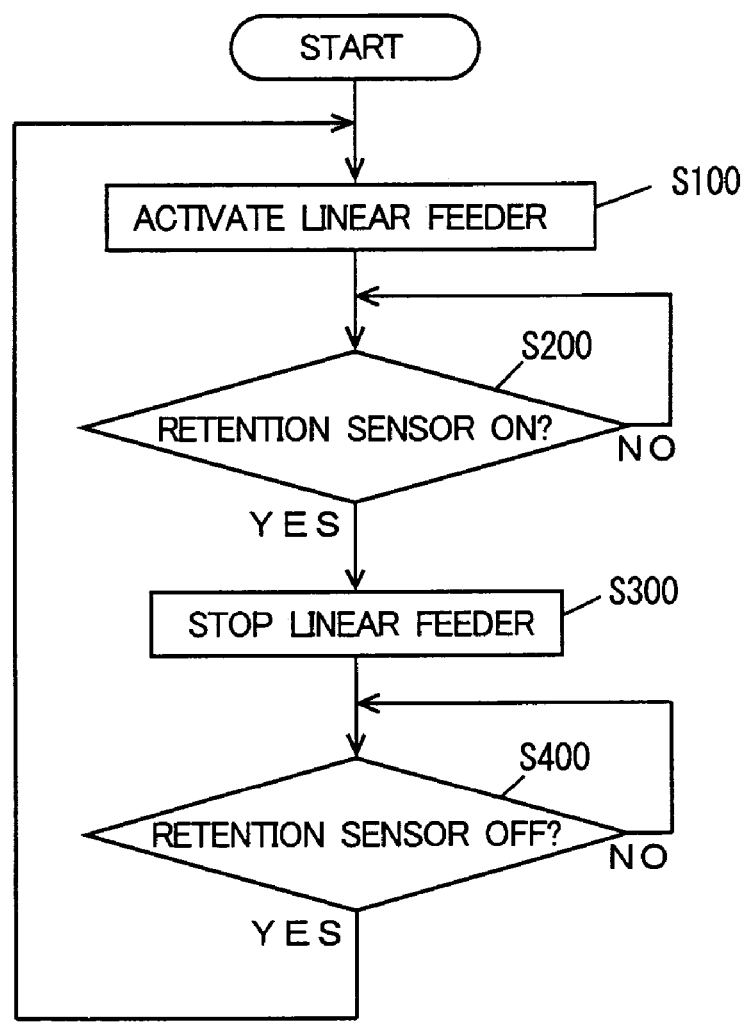
FIG. 17 is a flow chart representing the control scheme of a conveying control program executed by the appearance inspecting apparatus in accordance with the embodiment of the present invention.

Referring to FIG. 17, the flow chart of the process executed by the appearance inspecting apparatus in accordance with the present embodiment will be described. It is noted that FIG. 17 is limited to control for activating and stopping linear feeder 200, of the control related to conveyance in the appearance inspecting apparatus in accordance with the present embodiment.

In step (hereinafter, "step" will be simply denoted by S) 100, the control portion activates linear feeder 200. At this time, linear feeder 200 may be activated by turning on the main power of the appearance inspecting apparatus.

In S200, the control portion determines whether a retention sensor 202 is turned on or not. When retention sensor 202 is turned on (YES in S200), the process proceeds to S300, and otherwise (NO in S200), the process returns to S200 to wait for turning on of retention sensor 202.

In S300, the control portion stops linear feeder 200. In S400, the control portion determines whether retention sensor 202 is turned off or not. If retention sensor 202 is turned off (YES in S400), the process returns to S100, and linear feeder 200 starts its operation again. If not (NO in S400), the process is returned to S400 to wait for turning off of retention sensor 202.

The operation of the appearance inspecting apparatus in accordance with the present embodiment based on the structure and flow chart above will be described.

When the main power of the appearance inspecting apparatus is turned on, torsional vibration of parts feeder 100 starts, vibration of linear feeder 200 in the traveling direction of rubber stoppers 1000 starts, and the first and second conveying tables 400 and 500 start rotation. Further, compressed air is blown out from the air duct provided at air conveying portion 300.

In this state, a large number of rubber stoppers 1000 are put into bowl 160 of parts feeder 100. Rubber stoppers 1000 are conveyed to the upper portion of the bowl along a spiral conveying guide provided in bowl 160, with the up-and-down direction regulated by the spiral guide, while rubber stoppers 1000 themselves are rotated.

At the upper portion of the bowl, rubber stopper 1000 reaches the position of orientation regulator guide 112 while rotating, by the force in the direction of the arrow 122 and the force in the direction of the arrow 124, as shown in FIG. 4. At this position, compressed air is blown out from air ducts 108 and 110, and by the force in the direction of the arrow 122, rubber stopper 1000 rotates. Thus, the upper gap of rubber stopper fits in the orientation regulator guide 112, and rubber stopper 1000 moves in the direction of the arrow 124, sliding along orientation regulator guide 112.

Rubber stoppers 1000 regulated in prescribed up-and-down direction and in a prescribed orientation by parts feeder 100 are conveyed by linear feeder 200 to air conveying portion 300. Here, until retention sensor 202 detects a third rubber stopper 1000 (NO in S200), operation of linear feeder 200 continues (S100). When retention sensor 202 detects that the third rubber stopper 1000 is retained (YES in S200), vibration of linear feeder 200 is stopped (S300). At this time point also, by air duct 208, rubber stopper 1000 is conveyed from linear feeder 200 to air conveying portion 300.

When the third rubber stopper 1000 that has been retained is conveyed to air conveying portion 300 (YES in S400), vibration of linear feeder 200 starts again (S100). Rubber stopper 1000 that has reached air conveying portion 300 is conveyed toward the first conveying table 400 by the compressed air blown out from nozzle 302, with the upper gap of rubber stopper 1000 sliding along guide 306.

Rubber stopper 1000 that has reached the first conveying table 400 has its bottom portion held by the force of air sucked through suction opening 414, while an image of the upper portion of rubber stopper 400 is picked-up by the first inspection camera 452, so that appearance of the upper portion of rubber stopper 1000 is inspected.

When rubber stopper 1000 reaches a position where the first and second conveying tables 400 and 500 are opposed to each other, rubber stopper 1000 is transferred from the first conveying table 400 that holds the rubber stopper by the force of air sucked through suction opening 414 to the second conveying table 500 that holds the rubber stopper by the force of air sucked through suction hole 512.

Rubber stopper 1000 has its upper portion held by the force of air sucked through suction opening 512 of the second conveying table 512, and an image of the bottom portion of rubber stopper 1000 is picked-up by a second inspection camera 552, so that appearance of the bottom portion of rubber stopper 1000 is inspected.

The images picked-up by the first and second inspection cameras 452 and 552 are subjected to image processing, and any rubber stopper 1000 that is damaged, has rubber adhesion or the like is removed as defective, at selecting portion 600.

In this manner, by the appearance inspecting apparatus in accordance with the present invention, the rubber stoppers having a complicated shape are regulated in the up-and-down direction and aligned in the circumferential direction by the parts feeder that applies torsional vibration. The aligned rubber stoppers are conveyed to the air conveying portion by the linear feeder. A structure is adopted that prevents propagation of vibration from the vibratory parts feeder and linear feeder to the air conveying portion. Therefore, vibration of the parts feeder and the linear feeder is not propagated to the first and second conveying tables that are downstream of the air conveying portion. Therefore, inspection at the first and second inspecting portions is not influenced by the vibration. As a result, highly accurate inspection becomes possible.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention provides an inspecting apparatus enabling accurate inspection, of which inspection area is free of any influence even when objects have complicated shapes and are preliminarily aligned by using a vibratory parts feeder, and a conveying apparatus used for the inspecting apparatus.

According to the first invention, by the aligning means, the objects to be conveyed such as rubber stoppers having a complicated shape are aligned in tandem. At this time, the rubber stoppers placed on a spiral track move on the track and are aligned in tandem, while the rubber stoppers themselves rotate, because of torsional vibration. Thereafter, the aligned rubber stoppers are conveyed not by vibration but by the force generated by jet compressed air. Thus, the conveying means is free of any vibration, and therefore, it becomes possible to mount an inspection camera or the like on the conveying means and to inspect without any vibration. As a result, even when the objects are aligned preliminarily by using aligning means such as a vibratory parts feeder, the inspection area is free of any influence thereof, and thus, a conveying apparatus enabling accurate inspection can be provided.

According to the second invention, as the feeding means for generating vibration in the traveling direction of the objects to be conveyed is provided, vibration of the aligning means is less likely to propagate to the conveying means.

According to the third invention, when the predetermined number of rubber stoppers are retained by the retaining means, vibration of the feeding means is stopped, so as to stop transfer of the object from the feeding means to the conveying means. Thus, only a prescribed number of rubber stoppers are supplied to the conveying means that blows compressed air to the rubber stoppers. As a result, such a situation that the conveying means is forced to convey rubber stoppers exceeding the prescribed number at one time does not occur, and therefore, failure in conveying the objects can be prevented.

According to the fourth invention, as the aligning means is provided, the rubber stoppers that are placed on the spiral track move over the track and are aligned in tandem in a predetermined orientation, while the rubber stoppers themselves are rotated by the torsional vibration and the compressed air blown thereto. Accordingly, the aligning means can surely set the rubber stoppers to the predetermined orientation.

According to the fifth invention, by the aligning means, the objects to be inspected having a complex shape such as rubber stoppers are aligned in tandem. At this time, the rubber stoppers that are placed on the spiral track, for example, move over the track and are aligned in tandem, while the rubber stoppers themselves are rotated by torsional vibration. Then, the aligned rubber stoppers are conveyed by the force generated by the jet compressed air, not by vibration. The inspecting and conveying means suction-holds a surface not to be inspected of the object by air suction, and in this state, the objects are inspected by the inspecting means. Separating means separates acceptable rubber stoppers from defective ones, based on the result of inspection. Therefore, there is no vibration in the conveying means and the inspecting and conveying means, so that it is possible to inspect without any influence of vibration, by arranging the inspecting means in the inspecting and conveying means. As a result, even when objects are aligned preliminarily by using the aligning means such as a vibration parts feeder, the inspection area is free of any influence thereof, and thus, an inspecting apparatus capable of accurate inspection can be provided.

According to the sixth invention, the object to be inspected has a columnar bottom portion, and the bottom surface of the column is the surface that is not to be inspected. The projections abut at least two portions of the side surface of the column, and can easily position the object to be inspected. Particularly, when the object is conveyed by compressed air, it is difficult to position the object by utilizing a recessed portion fitting the shape of the entire circumference of the bottom surface of the column. Even in that case, the object to be inspected can easily be positioned.

According to the seventh invention, as the feeding means is provided that vibrates in the traveling direction of the objects to be inspected, vibration of the aligning means is less likely to propagate to the conveying means.

According to the eighth invention, when a predetermined number of rubber stoppers are retained by the retaining means, vibration of the feeding means is stopped, so that transfer from the feeding means to the conveying means is stopped. Accordingly, it follows that only a prescribed number of rubber stoppers are supplied to the conveying means that blows compressed air to the rubber stoppers. As a result, such a situation that the conveying means is forced to convey rubber stoppers exceeding the prescribed number at one time does not occur, and therefore, failure in conveying the objects can be prevented.

According to the ninth invention, as the aligning means is provided, the rubber stoppers that are placed on the spiral track move over the track and are aligned in tandem in a predetermined orientation, while the rubber stoppers themselves are rotated by the torsional vibration and the compressed air blown thereto. Accordingly, the aligning means can surely set the rubber stoppers to the predetermined orientation.

The invention claimed is:

1. A conveying apparatus, comprising:
   aligning means for aligning objects to be conveyed in tandem, by applying vibration to said objects to be conveyed;
   conveying means connected to said aligning means for conveying said objects, by blowing compressed air to said objects to be conveyed aligned in tandem; and
   feeding means connected to said aligning means and said conveying means, for feeding said objects to be conveyed to said conveying means, by applying another vibration in a traveling direction of said objects to be conveyed, to said objects to be conveyed which are aligned in tandem.

2. The conveying apparatus according to claim 1, further comprising:
   retaining means connected to said feeding means and said conveying means for retaining a predetermined number of objects to be conveyed; and
   control means controlling said feeding means such that vibration of said feeding means is activated and stopped, based on the number of objects to be conveyed retained by said retaining means.

3. The conveying apparatus according to claim 1, wherein said aligning means includes means for aligning said objects to be conveyed in tandem in a predetermined orientation, by torsionally vibrating a bowl having a spiral track formed therein and by blowing compressed air to the objects to be conveyed on said track.

4. A conveying and inspecting apparatus, comprising:
   aligning means for aligning objects to be inspected in tandem, by applying vibration to said objects to be inspected;
   air conveying means connected to said aligning means for feeding said objects, by blowing compressed air to said objects to be inspected aligned in tandem;
   feeding means connected to said aligning means and said conveying means, for feeding said objects to be conveyed to said conveying means, by applying another vibration in a traveling direction of said objects to be conveyed, to said objects to be conveyed which are aligned in tandem;
   conveying means connected to said air conveying means for conveying said objects to be inspected, by suction-holding a surface that is not to be inspected of said objects to be inspected; and
   inspection means operatively associated with the conveying means for inspecting the surface of the objects to be inspected.

5. The inspecting apparatus according to claim 4, wherein said object to be inspected has a columnar bottom portion, and a bottom surface of said column is said surface that is not to be inspected; and said inspecting and conveying means includes
- at least two projections provided to abut a side surface of said column in the traveling direction of said object to be inspected, and
- means for conveying said object by suction-holding said surface that is not to be inspected of said object to be inspected positioned by said projections.

6. The inspecting apparatus according to claim 4, further comprising:
- retaining means connected to said feeding means and said conveying means, for retaining a predetermined number of objects to be inspected; and
- control means for controlling said feeding means such that vibration of said feeding means is activated and stopped, based on the number of objects retained by said retaining means.

7. The inspecting apparatus according to claim 6, wherein said aligning means includes means for aligning said objects to be inspected in tandem in a predetermined orientation, by torsionally vibrating a bowl having a spiral track formed therein and by blowing compressed air to the objects to be conveyed on said track.

8. An apparatus for conveying and inspecting objects which comprises,
- a vibrating feeder which aligns objects in a uniform manner,
- a linear feeder connected to the vibrating feeder which applies another vibration in the traveling direction and air conveying means for conveying said objects by use of compressed air,
- a first conveying structure, substantially free of vibrational influences, adapted to a hold a first surface of the objects to be inspected while exposing a second surface thereof,
- an air conveying section connected to the linear feeder for conveying the objects to the first conveying structure,
- at least a second conveying structure adapted to receive the objects from the first conveying structure by holding the second surface while exposing the first surface thereof; and
- inspection devices operatively associated with the first and second conveying structures for inspecting the exposed surfaces of the objects on the respective conveying structures.

9. The apparatus of claim 8 wherein the objects are held to the first and second conveying structures by suction.

* * * * *